# 2,849,431

CHLORINATION OF POLYPROPYLENE

Warren Nesmith Baxter, Wilmington, Del., assignor to E. I. du Pont de Nemours and Company, Wilmington, Del., a corporation of Delaware No Drawing. Application July 5, 1955
Serial No. 520,139

3 Claims. (Cl. 260—93.7)

This invention relates to improvements in the synthesis of chloropolypropylene.

Various chlorinated propylenes have been known heretofore (cf. U. S. Patents 2,213,331, 2,291,574, 2,315,057, 2,416,061, 2,416,060, 2,416,069, 2,692,257, 2,692,258, and 2,692,259). Even when using high molecular weight polypropylenes obtained by the use of catalysts derived from titanium tetrachloride admixed with aluminum alkyls, the chlorinated products have been somewhat deficient in toughness at high chlorine contents. Thus, when the chlorine content was high enough to impart stiffness to the polymer, the resulting products were too brittle for many practical applications. For example, a chlorinated polypropylene prepared by introducing chlorine into a boiling solution containing 5.0 grams polypropylene (high molecular weight polymer, prepared by use of $TiCl_4$-aluminum alkyl catalyst) in 200 ml. carbon tetrachloride, until the chloropropylene product contained 46% Cl, when converted to a film about 10 mils thick (density 1.28), was found to be so brittle that it could not be creased even once without breakage. Generally speaking, the brittleness of chloropolypropylene films increases with increase in chlorine content, over the range of about 40% to 60%. At chlorine contents of 61% to 70% the chlorinated polypropylenes are excessively brittle and are not useful as such in applications where toughness is essential. The toughness of chlorinated propylenes is to some extent dependent upon the temperature at which the polypropylene is chlorinated, but by merely varying chlorination temperature it has not been possible heretofore to eliminate excessive brittleness from chloropolypropylene films having chlorine contents of 40% to 60% by weight.

An object of this invention is to prepare chloropolypropylene having greatly improved toughness. Another object is to prepare chloropolypropylene especially in film form, which has greater toughness than prior art chloropolypropylenes at chlorine contents of 40% to 60% by weight. Other objects of the invention will appear hereinafter.

It has been discovered, in accordance with this invention, that the toughness of chlorinated polypropylene can be greatly improved by carrying out the chlorination of polypropylene in carbon tetrachloride solvent containing titanium tetrachloride. The chlorination should preferably be continued until the chlorine content of the chloropolypropylene is within the range of 40% to 60% by weight.

The temperature of the chlorination may be varied over a wide range provided, however, that the temperature is suitable for maintaining the carbon tetrachloride in the liquid phase. The content of titanium tetrachloride need not exceed about 2% of the weight of carbon tetrachloride, and very much smaller contents of titanium tetrachloride, even as low as about 0.005%, have a perceptible beneficial effect. The chlorination may be performed in any suitable chlorination apparatus, such as a glass-lined vessel equipped with a chlorine inlet tube, a stirrer, and a reflux condenser from which exit gas passes to a hydrogen chloride absorber. It is preferred to employ a source of actinic radiation to catalyze or initiate the chlorination. Conventional techniques for removal of oxygen and moisture (by distilling off a small foreshot of $CCl_4$ prior to introducing $Cl_2$) may be employed. When the reaction is performed without radiation, some other source of activating energy, such as peroxy compound, may be used, if desired.

The separation of the chloropolypropylene from the reaction mixture can be achieved by any of the known methods for separating chlorosulfonated polyethylene, chlorinated rubber, or chloropolyethylene from reaction mixtures containing these respective products in carbon tetrachloride solution, e. g., removal of solvent by evaporation, or precipitation by adding a $CCl_4$-compatible nonsolvent for the polymer.

The chlorination can be performed batchwise or continuously. From a practical standpoint, the concentration of product which can be built up, prior to separation, is, in certain instances, limited primarily by the viscosity of the mixtures. Because of this, the content of polypropylene should initially not exceed about 10% of the weight of carbon tetrachloride. A good practical operating range is about 1% to 10% of polypropylene by weight of carbon tetrachloride.

The invention is further illustrated by means of the following examples.

Example 1

To 200 ml. $CCl_4$ was added 5 grams of partially crystalline, high molecular weight solid polypropylene, and 0.2 gram $TiCl_4$. The mixture was heated to boiling (ca. 77°) in a glass-lined vessel equipped with a chlorine inlet tube, and a reflux condenser operating at —80°. Chlorine was introduced until the weight increase showed that the polymer contained 50% Cl. The reaction product was isolated by precipitation with methanol, repeated washings with methanol, and drying. The resulting chloropolypropylene had a Cl content of 50%, and a density of 1.32. Films compression molded from this material were very tough and could be folded along a crease a large number of times without fracture. In contrast with this, chloropolypropylene film similarly prepared from the same polymer, but without addition of $TiCl_4$ to the chlorination mixture could not be folded even once without breakage.

Example 2

Example 1 was repeated using room temperature for the chlorination instead of $CCl_4$ refluxing temperature. The chloropolypropylene product had a chlorine content of 48%, the density being 1.29. The product made in the presence of $TiCl_4$ could be folded repeatedly, in film form, along the crease line, while that made in the absence of $TiCl_4$ could not be flexed along a crease line without breakage.

The process and product of this invention are especially useful in connection with the manufacture of films, coated fabrics, coating compositions, thickeners, flooring materials, etc. These products may contain stabilizers, antioxidants, fillers, and the like, of the kinds which are well known in the chlorinated polymer art. Chloropolypropylenes obtained by the process of this invention are self-extinguishing at chlorine contents of at least 50%.

What is claimed is the following:

1. Process for chlorinating normally partially crystalline solid polypropylene in $CCl_4$ solution by reaction with chlorine in the presence of 0.005 to 2.0% titanium tetrachloride, based on the weight of $CCl_4$, said polypropylene being further characterized in that it is obtained by homopolymerization of propylene in the presence of a TiCl$_4$-aluminum alkyl catalyst.

2. Chlorinated polypropylene having a chlorine content of 40% to 60%, made by the process of claim 1, and further characterized in that it is tougher than chlorinated polypropylene from the same polypropylene at the same chlorine content, similarly prepared except that no TiCl$_4$ is present during the chlorination.

3. The composition of claim 2 in the form of a film.

References Cited in the file of this patent

UNITED STATES PATENTS

| | | |
|---|---|---|
| 2,183,556 | Fawcett | Dec. 19, 1939 |
| 2,692,257 | Zletz | Oct. 19, 1954 |

OTHER REFERENCES

Natta et al.: J. Am. Chem. Soc., 77, 1708–1710, March 1955.

UNITED STATES PATENT OFFICE
Certificate of Correction

Patent No. 2,849,431                                                      August 26, 1958

Warren Nesmith Baxter

It is hereby certified that error appears in the printed specification of the above numbered patent requiring correction and that the said Letters Patent should read as corrected below.

Column 1, line 17, for "propylenes" read —polypropylenes—; line 32, for "chloropropylene" read —chloropolypropylene—; line 41, for "propylenes" read —polypropylenes—.

Signed and sealed this 11th day of November 1958.

[SEAL]

Attest:
KARL H. AXLINE,
*Attesting Officer.*

ROBERT C. WATSON,
*Commissioner of Patents.*